Nov. 24, 1964  J. F. JOHNSON  3,158,427
OSCILLOGRAPH EMPLOYING GALVANOMETER TRANSPORT
Filed Dec. 13, 1957  3 Sheets-Sheet 1

INVENTOR.
James F. Johnson
BY
Adams, Forward and McLean
ATTORNEYS

Nov. 24, 1964 J. F. JOHNSON 3,158,427
OSCILLOGRAPH EMPLOYING GALVANOMETER TRANSPORT
Filed Dec. 13, 1957 3 Sheets-Sheet 2

INVENTOR.
James F. Johnson
BY
Adams, Forward and McLean
ATTORNEYS

Nov. 24, 1964 J. F. JOHNSON 3,158,427
OSCILLOGRAPH EMPLOYING GALVANOMETER TRANSPORT
Filed Dec. 13, 1957 3 Sheets-Sheet 3

INVENTOR.
James F. Johnson
BY
Adams, Forward and McLean
ATTORNEYS ced Nov. 24, 1964

3,158,427
OSCILLOGRAPH EMPLOYING GALVANOMETER TRANSPORT
James F. Johnson, Tulsa, Okla., assignor, by mesne assignments, to Sinclair Research, Inc., New York, N.Y., a corporation of Delaware
Filed Dec. 13, 1957, Ser. No. 702,640
4 Claims. (Cl. 346—33)

My invention relates to the graphical reproduction of electrical signals and in particular provides an oscillograph for reproducing a plurality of individual transient signals in side-by-side relationshp.

For many years technical information, for example operating data relating to the performance of a machine, has been recorded in graphical form, that is, as a trace inked or otherwise marked on a surface such as that of a roll of paper. In many instances more than one such trace is desirably marked alongside another to indicate related information in parallel relationship in order that correlation of such related information can be facilitated. As an example, it is frequently desirable to reproduce seismic data in side-by-side relationship in the same sequence as such information was obtained along a profile, thus constructing what is sometimes known as a seismic cross-section.

An extremely useful device for presenting such information in multi-trace form is the mirror oscillograph in which a large number, for example twenty-four mirror galvanometers are mounted in a common block with their reflecting elements closely spaced together such that a sheet of photosensitive paper or film which is drawn past the galvanometer head will simultaneously receive twenty-four separate exposure traces in closely spaced parallel side-by-side relationship. Frequently, however, it is desirable to co-relate a greater number of records than can be made simultaneously, particularly for example, in the construction of seismic cross-sections which can involve upwards of a thousand separate records.

It is an important object of my present invention to provide a device of the mirror oscillograph type for photographically reproducing in side-by-side relationship as many as several thousand separate records.

It is also an important object of my invention to provide such a device which can readily be synchronized with suitable playback devices for the original records in order to permit accurate horizontal adjustment of the individual records and thereby facilitate correlation from one record to the next.

It is still a further object of my invention to provide such a device in which all of the records appear on a single sheet of photographic paper or film, thereby avoiding piecing of separate records to form a composite cross-section.

It is yet another object of my invention to provide such a device in which one or a small group of records are photographed at a time in order to facilitate driving the galvanometer movements with a single playback device which would have a maximum of usually twenty-four or forty-eight channels, and yet which will permit accurate control of the rate of movement of the recording device each time a record is made such that errors arising from variation in playback rate from one set of records to the next can be substantially eliminated.

It is also an object of my invention to provide such a device which is simple in construction and operated by a minimum of controls.

These and other objects of my invention are essentially obtained by mounting a bank of mirror galvanometers for reciprocating motion along a table and by positioning a roll of wide photographic paper or film alongside the galvanometers for movement transversely to the direction of movement of the galvanometers on the table. In a more specific aspect a vertical bank of mirror galvanometers, housed in a box, are mounted on a carriage which tracks along a table with a substantially vibrationless linear movement. The box is provided on one side with vertically elongated vertical opening which, as the box moves along the table, passes adjacent to a horizontally elongated vertical window in a camera box extending lengthwise alongside the galvanometer transport table. The camera box houses a pair of spindles which are rotatably supported in the box in horizontal position, one above and the other below the window in the camera box, such that a roll of photographic paper or film mounted on one spindle can be drawn past the window in the camera box to the other spindle.

In another specific aspect a continuously operable record playback device is employed for cyclic electrical reproduction of the records to be photographically reproduced. Thus correction of step-out, equalization of maximum amplitudes and similar operations can be performed to facilitate later record correlation. In this arrangement the galvanometer is drawn by a motor which is slaved to the playback device, such that the rate of galvanometer linear movement is in a fixed ratio to the rate of movement of the playback device, and means are provided to permit rapid connection and disconnection of the galvanometer and its motor, such that the galvanometer can be moved only during a single, selected cycle of record playback to expose the photosensitive paper or film on which the side-by-side records are to be made.

For a more complete understanding of the practical application of the principles of my invention, reference is made to the appended drawings in which.

Figure 4:
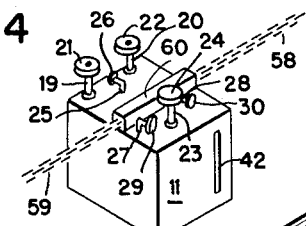
FIGURE 4 is a fragmentary isometric view of a portion of the apparatus of FIGURE 1 shown in inverted position.

Referring more particularly to FIGURES 1–4, the reference numeral 10 designates the mirror oscillograph of this invention. Mirror oscillograph 10 generally includes a galvanometer box 11 (see FIGURES 5 and 6 for interior details), a table 12, and a camera box 13.

Figure 1:
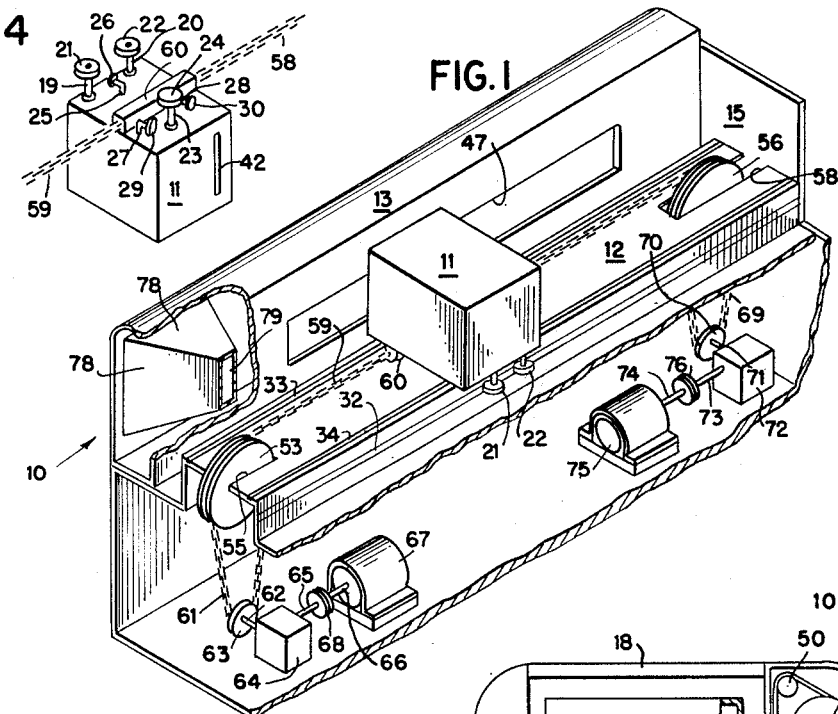
FIGURE 1 is an isometric view of an apparatus constructed in accordance with this invention, with a portion of the enclosing structure cut away to illustrate the operative relationship of the various parts.
Figure 2:
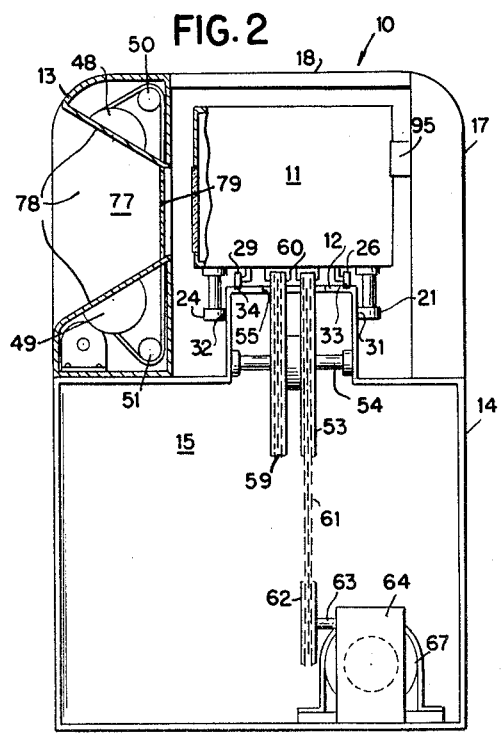
FIGURE 2 is a view taken from the left hand end of the apparatus seen in FIGURE 1 and is shown partly in section with the end panel removed.
Figure 3:
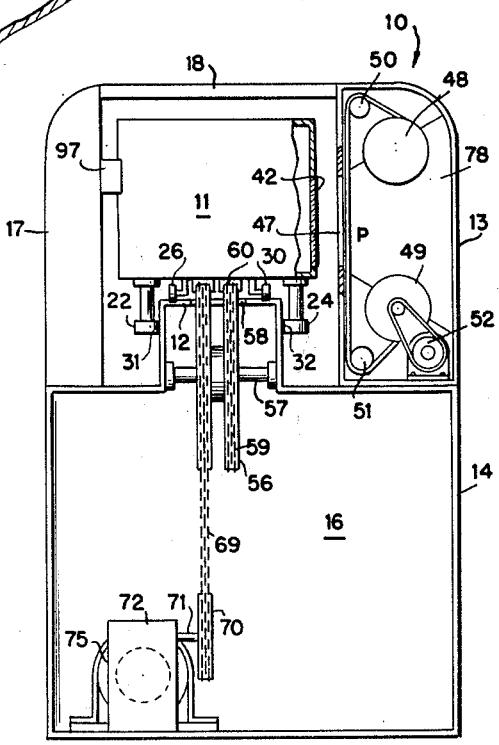
FIGURE 3 is a view similar to FIGURE 2 of the other end of the apparatus shown in FIGURE 1.

Table 12 is supported affixed on a cabinet 14 between end panels 15 and 16 (end panel 16 is removed in FIGURES 1 and 2 and end panel 15 is removed in FIGURE 3). Camera box 13 is mounted on cabinet 14 adjacent to the rear edge of table 12 as seen in FIGURE 1, and extends lengthwise between end panels 15 and 16 above the level of table 12. The forward portion of cabinet 14 supports a front cover box 17 which extends between end panels 15 and 16 adjacent to the forward side of table 12 and extends above the level of table 12. (Front cover box 17 is not shown in FIGURE 1.) A top cover plate 18 is affixed at its ends in the upper ends of end panels 15 and 16 and extends above table 12 between front cover box 17 and rear camera box 13, thereby enclosing the space between camera box 13, front cover plate 17, and end panels 15 and 16. Desirably front cover box 17 and rear camera box 13 are removably affixed to cabinet 14, end panels 15 and 16 and top cover plate 18, in order to permit removal of front cover box 17 to provide access to the interior of oscilloscope 10 above table 12 and to permit camera box 13 to be removed for reloading.

Galvanometer box 11 is mounted on table 12 for sliding movement in a straight line across the top of table 12 between end panels 15 and 16. Referring more particularly to FIGURE 4, which shows the underside of galvanometer box 11, it will be observed that along its forward portion (to the rear in FIGURE 4) galvanometer box 11 carries a pair of depending legs 19 and 20 which at their lower ends (upper ends in FIGURE 4) rotatably support a pair of wheels 21 and 22, respectively, mounted in horizontal position for free rotation about a vertical axis. Toward the rear the underside of box 11 carries a third depending leg 23 which at its lower end supports a horizontal wheel 24 which is also freely rotatable about a vertical axis. It will be noted that legs 19 and 20 are spaced near the forward corners of the under surface of galvanometer box 11 and that leg 23 is positioned medially of the rear portion of the under surface of galvanometer box 11. Inwardly of legs 19 and 20 there is affixed to the forward portion of the under surface of galvanometer box 11 an angle strut 25 which at its outer end freely and rotatably supports a small wheel 26 which is thus medially positioned between wheels 21 and 22 for rotation about a horizontal axis and which, as particularly seen in FIGURES 2 and 3, is positioned above wheels 21 and 22. Similarly, toward the rear of the underside of galvanometer box 11 spaced apart on each side of leg 23 and inwardly from leg 23 there are affixed a pair of angle struts 27 and 28 which, like strut 26, freely and rotatably support a pair of vertical wheels 29 and 30, respectively.

Referring more particularly to FIGURES 2 and 3, it will be seen that the location of the various elements described above on the under surface of galvanometer box 11 is such that wheels 21, 22 and 24 ride against the side walls of table 12 below the top level of table 12. Desirably such wheels are positioned to embrace the sides of table 12 tightly. A length of plastic friction tape 31 is stretched length-wise along the forward face of table 12 along the track of wheels 21 and 22. Similarly a length of plastic friction tape 32 is affixed along the rear face of table 12 in the track of wheel 24. Tapes 31 and 32 provide a slight resiliency in the support of wheels 21, 22 and 24 to prevent jamming and vibration as galvanometer box 11 travels across table 12. It will be further observed that wheels 29 and 30 ride in a slight groove 33 cut lengthwise along the rear of table 12 and wheel 26 rides in a similar groove 34 extending lengthwise in the forward portion of the top surface of table 12. Grooves 33 and 34 serve as guide tracks further controlling the reciprocation of galvanometer box 11 on table 12. Desirably, friction tape is also seated in the bottoms of grooves 33 and 34 to prevent bouncing of galvanometer box 11 as it travels across table 12.

Figure 6:
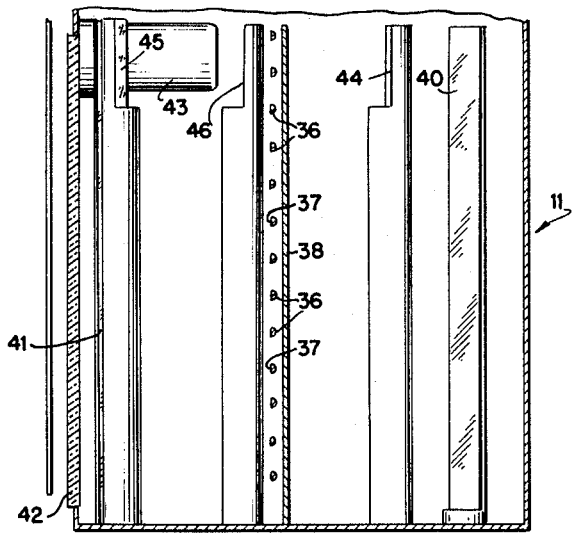
FIGURE 6 is a vertical section taken at line 6—6 in FIGURE 5.
Figure 5:
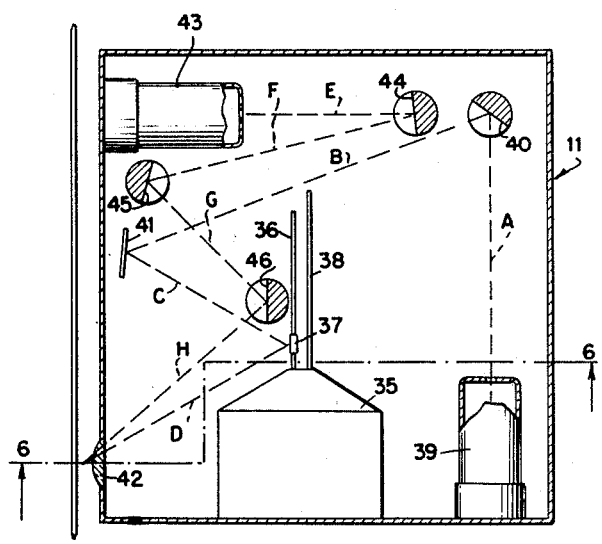
FIGURE 5 is a fragmentary, enlarged, plan view of the portion of the device shown in FIGURE 4, with its top cover removed.

Rerferring more particularly to FIGURES 5 and 6, galvanometer box 11 toward its left side (bottom in FIGURE 5) houses a mirror galvanometer block 35 from which extends a vertical bank of horizontally rotatable galvanometer movements 36, each carrying a planar mirror 37 facing approximately to the rear (left in FIGURE 5) of box 11. A vertical partition 38 extends parallel to galvanometers 36 from galvanometer block 35 just forward of galvanometers 36 to shield mirrors 37 from stray light reflections to the front of galvanometer box 11. In the forward portion of galvanometer box 11, shielded from mirrors 37 by galvanometer block 35 and partition 38, is a projection lamp 39 which horizontally projects a vertically elongated beam of light, as indicated by dashed line A in FIGURE 5, onto a mirror 40 located in the right hand forward portion of box 11 (upper right corner in FIGURE 5). Mirror 40 lies in a vertical plane and is angled to direct the beam of light B reflected from mirror 40 to a second vertical mirror 41. The reflected beam C from mirror 41 which is positioned to the rear of galvanometers 36 is reflected onto mirror elements 37 on galvanometers 36. The resultant reflected rays D, which are vertically spaced from each other, pass from mirrors 37 through a vertically positioned cylindrical lens 42 mounted in the rear wall of galvanometer box 11.

In the upper right rear corner of galvanometer box 11 (upper left hand corner in FIGURES 5 and 6) is positioned a second projection lamp 43 which projects a short vertical beam of light horizontally, as indicated by dashed lines E, against a vertical positioned mirror 44 located adjacent to mirror 40 out of the path of light beam B. The reflected beam F from mirror 44 is directed against a vertical mirror 45 located between lamp 43 and mirror 41 and positioned to direct its reflected beam G against a vertical mirror 46 mounted near the outer ends of shafts 36. The reflected beam of light H from mirror 46 is also directed through lens 42.

Referring again to FIGURES 1–3, it will be noted that camera box 13 is thus positioned adjacent to lens 42 of galvanometer box 11 such that the light beams D and H projected through lens 42 impinge against the inner face of camera box 13 as galvanometer box 11 moves horizontally across table 12. A window 47 is cut in the inner vertical face of camera box 13 with a height approximately equal to that of lens 42 and extending lengthwise along the major portion of the length of table 12 such that light beams D and H pass into camera box 13 through window 47. A horizontal spindle 48 is rotatably mounted in camera box 13 above window 47. Similarly, a second horizontal spindle 49 is rotatably mounted in camera box 13 below window 46. A pair of idler rolls 50 and 51 are mounted horizontally for rotation, respectively, above and below window 47 adjacent to the forward vertical face of camera box 13 to direct a roll of photographic paper or film P from spindle 48 to spindle 49 directly behind window 47. A suitable mechanism 52 of conventional design is employed to drive spindle 49 a predetermined amount to draw a new section of film P behind window 47 when desired.

A double sprocket 53 is mounted at the left end of table 12 on a horizontal axle 54 extending transversely in cabinet 14 beneath table 12. A short segment of sprocket 53 extends above table 12 through a short lengthwise slot 55 cut in the left end of table 12. Similarly, a double sprocket 56 is mounted on axle 57 extending horizontally beneath table 12 in cabinet 14 with the upper segment of sprocket 56 extending through a short lengthwise slot 58 cut into the right end of table 12. The rear halves of sprockets 53 and 56 carry between them an endless link chain 59 which extends beneath table 12 and also which extends just on top of table 12 beneath galvanometer box 11 to which it is secured by a clamp 60 (see FIGURE 4). The forward half of sprocket 53 carries an endless link chain 61 which extends about a drive sprocket 62 on the output shaft 63 of a right-angle drive transmission 64. Transmission 64 is driven by a shaft 65 coupled to the output shaft 66 of an electric motor 67 through an electromagnetic clutch device 68. Similarly, the forward half of double sprocket 56 carries an endless link chain 69 which extends down into cabinet 14 about a drive sprocket 70 affixed on the output shaft 71 of a second right-angle drive transmission 72. Transmission 72 is driven by a shaft 73 coupled to the output shaft 74 of a synchronous motor 75 by an electromagnetic clutch device 76.

Referring particularly to FIGURES 1, 2 and 3 it will be noted that camera box 13 is provided with a viewer 77 for observing the alignment and spacing of the reflected paths D of light from mirrors 37 through lens 42. Viewer 77 is formed by four trapezoidal walls 78 joined together along non-parallel edges and affixed at their larger bases in a large opening in the outer wall at the left end of camera box 13 and affixed in their shorter bases on the inner wall of camera box 13 defining a vertically elongated window 79 adjacent to the left end of window 47 which is aligned with lens 42 when galvanometer box 11 is in its normal rest position at the left end of table 12 adjacent to sprocket 53. Opening 79 retains a pane of ground glass lying in the same plane as photographic film P behind window 47.

Figure 7:
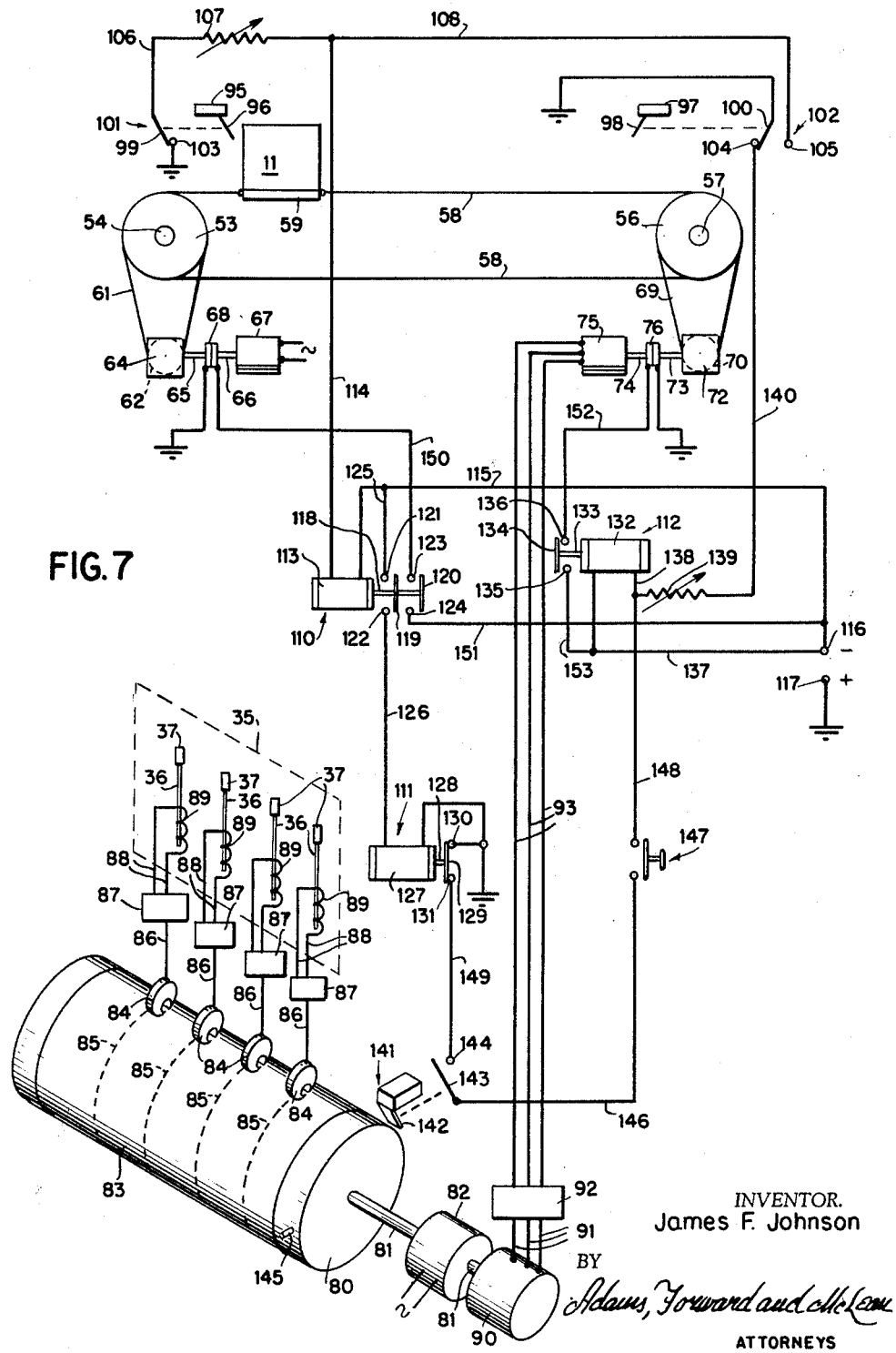
FIGURE 7 is a schematic representation of the electrical system including associated playback, powering and control devices employed in the apparatus shown in FIGURES 1–6.

Referring more particularly to FIGURE 7, which illustrates the electrical system, the reference numeral 80 designates a rotatable drum affixed to the output shaft 81 of a motor 82 to be rotated by motor 82. Drum 80 is adapted to receive a conventional multi-track magnetic sound recording film 83 of the type which is usually employed for recording seismic records containing related information. A number of magnetic pickup heads 84 are mounted adjacent to drum 80 to convert the magnetically recorded information into electrical signals. Each pickup head 84 is thus mounted in a position adjacent to a track 85 on film 83 which contains a single record. The electrical output signal of each pickup head 84 is connected, as indicated by lines 86, to a separate amplifier 87 which in turn is connected by lines 88 to energize the armature winding 89 of a separate galvanometer 36 of galvanometer block 35. Amplifier 87 can, and desirably does, include a cathode ray tube for displaying the electrically reproduced records along with conventional equipment for making any desired adjustments and modifications of the reproduced records.

The electrical control system shown in FIGURE 7 is designed to correlate the rate of linear movement of galvanometer box 11 with the rate of rotation of drum 80 such that if because of fluctuations in power supply frequencies or the like motor 82 slows down or speeds up, an equivalent decrease or increase in the rate of linear movement of galvanometer box 11 also occurs. This is accomplished by attaching a two-phase synchronous generator 90 on the output shaft 81 of motor 82 to be driven by motor 82. The two-phase output voltage of generator 90 is connected by lines 91 as an input to amplifier 92 which suitably can be installed in cabinet 14 adjacent to motor 75. The amplified output of amplifier 92 is connected by lines 93 to two-phase synchronous motor 75 which therefore is driven slaved to motor 82. Appropriately, the sprocket ratio of sprockets 56 and 70 and the gear ratio of transmission 72 are selected such that in a single revolution of drum 80, galvanometer box 11 will travel across the face of table 12 a distance just short of its total permissible clearance between sprockets 53 and 56.

A housing 95 for a micro switch 101 is mounted on the inner face of front cover box 17 near end panel 16 in a position such that its actuating arm 96 faces galvanometer box 11 and is tripped by galvanometer box 11 when galvanometer box 11 is in a position spaced only a short distance from sprocket 53. Similarly, a housing 97 for a second micro switch 102 is mounted at the other end of the inside face of front cover box 17 with its actuating element 98 positioned to be tripped by galvanometer box 11 as galvanometer box 11 approaches sprocket 56 and is only a short distance therefrom. Actuating arms 96 and 98 of micro switches 101 and 102 are mechanically ganged to operate their respective pole pieces 99 and 100, switch 101 being a single pole, single throw switch and switch 102 being a single pole, double throw switch. Pole 99 is spring biased to a normally closed position on a contact 103, and pole 100 is spring biased to a closed position upon contact 104 and away from second contact 105. Pole 99 is connected by lead 106 to a variable resistor 107 which in turn is connected by lead 108 to normally open contact 105 of switch 102. Normally closed contact 103 of switch 101 and pole 100 of switch 102 are each grounded.

Switches 101 and 102, as will be evident from their positioning are employed to limit the travel of galvanometer box 11 within the confines of table 12 between sprockets 53 and 56. This is accomplished along with certain resetting functions by means of relay 110, relay 111 and relay 112.

Relay 110 includes a solenoid coil 113 which is connected by leads 114 and 115, respectively, to the junction of resistor 107 and lead 108 and to the negative terminal 117 of a suitable D.C. power supply, the positive terminal 117 of which is grounded. Resistor 107 thus is connected between terminal 116 and ground in series with coil 113 and pole 99 of switch 101. Resistor 107 is adjusted to limit the flow of current through coil 113, when switch 101 is in its unactuated normally closed position, to a value which is insufficient to operate the armature 118 of solenoid 113, but which is sufficient to hold armature 118 in actuated position.

Armature 118 of relay 110 carries pole pieces 119 and 120. Pole piece 119 is positioned to close contacts 121 and 122 when armature 118 is actuated by solenoid 113. Similarly pole 120 is positioned to close contacts 123 and 124 when armature 118 is actuated. Contact 121 is connected by lead 125 to lead 115 and hence to negative power supply terminal 116. Contact 122 is connected by lead 126 to the solenoid coil 127 of relay 111, the other end of coil 127 being grounded. Thus when armature 118 of relay 110 is actuated, relay 111 is also energized to actuate its armature 128 to withdraw a pole piece 129 mounted on armature 128 from a normal position closing contacts 130 and 131.

Relay 112 includes a solenoid coil 132 for actuating an armature 133, which carries a pole piece 134, to close pole piece 134 upon normally open contacts 135 and 136. Coil 132 is connected by lead 137 to negative power terminal 116 and by lead 138 to variable resistor 139, the other side of which is connected by lead 140 to normally closed contact 104 of switch 102. Thus relay 112, like relay 110, when its controlling switch 102 is unactuated is energized in a limited manner in series with resistor 139, which, like resistor 107, is set to limit the current flow through solenoid 132 such that armature 133 will remain either actuated or unactuated. Resistors 107 and 139 thus are in the nature of holding devices so long as their respective controlling switches 101 and 102 remain unactuated.

It will be further observed that when switch 102 is actuated by contact of galvanometer box 11 with actuating element 98, the holding circuit for relay 112 is broken and, simultaneously, actuating energization is supplied to relay 110 by closure of pole 100 upon contact 105. Actuation of switch 101 by contact of galvanometer box with actuating element 96 similarly breaks the holding circuit for relay 110 but dissimilarly does not supply the energizing current for actuating relay 112. The latter function is obtained through a micro switch 141 including an actuating element 142 which operates a pole 143 spring biased in a position normally open from a contact 144. Actuating element 142 of micro switch 141 is positioned to be tripped once each revolution of drum 80, suitably by a pin 145 affixed to drum 80 which is positioned to synchronize actuation of switch 141 with a position of each recording track 85 on film 83 at the beginning of the recording with reference to pickup heads 84. The energizing potential for relay 112 is thus supplied upon closure of pole 143 with contact 144 if relay 111 is unenergized, since pole 143 is connected by lead 146 through normally open push button switch 147 and lead 148 to lead 138 from solenoid coil winding 132 of relay 112 and since contact 144 is connected by lead 149 to contact 131 which is normally closed to contact 130 which in turn is grounded.

Completion of the control system for limiting movement of galvanometer box 11 includes a system for supplying energizing potentials to electromagnetic clutches 68 and 76 upon actuation of relays 110 and 112 respectively. This is accomplished by grounding one side of each of the operating coils of electromagnetic clutches 68 and 76 and by connecting the other side of the coil of clutch 68 by a lead 150 to contact 123 of relay 110, by connecting its associated contact 124 by a lead 151 to negative power supply terminal 116, by connecting the other side of the coil of clutch 76 by a lead 152 to contact 136 of relay 112, and by connecting its associated contact 135 to a lead 153 which is connected to lead 137 and thence to negative power terminal 116.

In operation, a magnetic recording film 83 containing a series of seismic recordings in magnetic tracks 85 is mounted on drum 80 in the conventional manner for playback operation. Photographic film P wound upon spindle 48 is fed over idler roll 50 past window 47 over idler roll 51 and threaded upon the hub of spindle 49, the latter being of course done in a dark room with camera box 13 removed from the remaining equipment. While still in a dark room, camera box 13 is then affixed in position on cabinet 14 and the remainder of oscillograph 10 is assembled, if this has not previously been done, to enclose galvanometer box 11 in the dark chamber formed between table 12, end panels 15 and 16, camera box 13, front cover box 17 and top plate 18. Ordinarily, of course, unless adjustments to the mechanical equipment or to the parts in galvanometer box 11 are necessary, only camera box 13 need be removed for loading or unloading film P.

The initial dead rest position of galvanometer box 11 as indicated previously is at the left end of table 12 with lens 42 adjacent to window 79 in viewer 77. In this position when projection lamp 39 is energized it is thus possible to check through viewer 77 the positions of the spots of light appearing on the ground glass pane in window 79 which are cast by light rays D to insure that galvanometer movements 36 are properly adjusted for correct spacing and alignment.

The electrical equipment, including motors 67 and 82, is then energized and connections which may be disconnectable such as lines 93, leads 146 and 148, and connections 86, all of which run between the playback equipment including drum 80 and mirror oscillograph 10, are checked to see that they are secure. At this point galvanometer box 11 is still in the position at the left end of table 12 as seen in FIGURE 1, with lens 42 adjacent to viewing window 79 in camera box 13 and with actuating element 96 of micro switch 101 actuated. Relay 113, therefore, is unenergized and accordingly relay 111 is unenergized and electromagnetic cluch 68 is unenergized. Relay 112 is unactuated at the commencement of operation but is supplied with limited energization since micro switch 102 is unactuated. Accordingly electromagnetic clutch 76 is also unenergized. The rotation of motor 82 drives drum 80 causing pickup heads 84 cyclicly to reproduce as electrical signals the information recorded on tracks 85. Since push button 147 is in open position, the repetitive closure of micro switch 141 fails to actuate relay 112. Suitable adjustments at amplifiers 87 by filtering and other techniques are then made to develop the information which it is desired to photograph in side-by-side relationship.

When the desired information is in the form in which it is desired to photograph, push button 147 is depressed closing its associated contacts, whereupon in the next succeeding cycle of operation of drum 80 as the recorded information just is about to commence a reproduction cycle, pin 145 actuates element 142 supplying full energizing potential to solenoid 132 which thereupon actuates armature 133 to close contacts 135 and 136 and supply energizing potentials to clutch 76. Since synchronous motor 75 is continuously operating, the energization of clutch 76 immediately causes galvanometer box 11 to move from left to right across the face of table 12.

Mirrors 37 of course are constantly moving in accordance with the recorded information on tracks 85, and, immediately after galvanometer box 11 starts to move, paths D of their reflected light beams pass into window 47 on to film P thus exposing film P lengthwise with a plurality of traces reproducing the desired information in side-by-side relationship. At the same time lamp 43 is periodically actuated in a conventional manner by a timer or the like to expose time lines transversely to the direction of the traces.

Immediately upon commencement of motion of galvanometer box 11, micro switch 101 is released to unactuated position. The consequent closure of pole 99 on contact 103 sets up the holding circuit through resistor 107 for relay 110 which however remains unactuated since micro switch 102 is unactuated.

As galvanometer box 11 completes its traverse before window 47 exposing typically twenty four traces across film P and finally contacts actuating element 98 of switch 102, pole 100 shifts from contact 104 to a position grounding contact 105, first destroying the holding circuit for relay 112, which is thereby released breaking the energizing circuit for electromagnetic clutch 76, and immediately thereafter supplying full energization to relay 110 to actuate armature 118 closing contacts 123 and 124, thereby energizing clutch 68. Since motor 67 is energized and operating all the time, actuation of clutch 68 immediately stops galvanometer box 11 and reverses its direction. Armature 118 also closes contacts 121 and 122 which energize relay 111 to break the potential starting circuit through switch 141 and push button 147 to prevent accidental re-energization of this circuit during the return movement of galvanometer box 11.

As galvanometer box 11 withdraws, desirably lamps 39 and 43 are disconnected to prevent further exposure of film P. Entirely suitable operation of lamps 39 and 43 can be obtained by connecting them to their power source through an extra set of normally open contacts on relay 112. Also immediately as galvanometer box 11 starts its return path, micro switch 102 is released to unactuated position supplying limited holding current to relay 112 which, however, remains unactuated, and withdrawing energizing potential for relay 110, whichever however remains actuated since the limited energization supplied by the holding circuit through resistor 107 is operative.

At the end of the return travel path of galvanometer box 11, galvanometer box 11 trips micro switch 101 thereupon releasing the holding circuit for relay 110 which then releases, opening the energizing circuit for electromagnetic clutch 68 which thereupon releases, stopping galvanometer box 11 and opening the energization circuit for relay 127 which also thereupon releases restoring the circuits for a subsequent operation such as that described above.

Ordinarily, the film P in camera box 13 is then further rolled onto spindle 49 by mechanism 52 to draw an unexposed portion into window 47. Record film 83 is changed for another record film, and the operation repeated.

Although many obvious modifications of the mirror oscillograph of my invention will be obvious and do not require description here one simple modification of particular merit should be pointed out. Frequently it is desirable to prepare separate records of the same seismic data, that is records in which the data are presented as "wiggle" traces and in some other manner, as for example, variable density bands. These separate records can readily be made simultaneously with the same original data by the simple expedient of replacing the front cover box 17 of oscillograph 10 with a second camera box of complementary construction to camera box 13. In this modification galvanometer box 11 is also provided with a second galvanometer block and optical system which are arranged to project the light beams reflected from the various galvanometer's movements through a lens disposed on the opposite side of galvanometer box from lens 42. In this manner the information on tracks 85 can be fed through a conventional amplifier system, such as that suggested in FIGURE 7, to one bank of galvanometers and simultaneously fed through devices for presenting the seismic information in such other form as may be desirable which are arranged to drive the second bank of galvanometers. Thus two records will be obtained which correspond to the same original seismic data and are exactly linear in relation to each other.

I claim:

1. A recording oscillograph which includes a table, a carriage mounted for reciprocating movement across said table, a mirror galvanometer mounted on said carriage, a light source mounted on said carriage, an optical system mounted on said carriage for directing a ray of light from said light source and reflected by said mirror galvanometer transversely to the line of movement of said carriage across said table, means for mounting a photosensitive web adjacent to one side of said table and extending lengthwise of the line of movement of said carriage thereby to intercept said ray of light as said carriage is moved across said table, means for reeling said web transversely to the line of movement of said carriage, playback means for cyclicly reproducing a recorded transient signal, said playback means having an electrical output signal cyclicly corresponding to said transient signal and including a motor drive, means for delivering said output signal as an input signal to said mirror galvanometer, and means slaved to the drive motor of said playback means for driving said carriage across said table.

2. A recording oscillograph according to claim 1 in which said means for reeling said photosensitive web includes a pair of spindles rotatably supported in horizontal position, one said spindle being located above the other whereby said photosensitive web mounted on one said spindle can be reeled onto the other said spindle transversely to the line of movement of said carriage.

3. A recording oscillograph which includes an elongated horizontal table, means defining a track extending lengthwise of said table, a carriage mounted for reciprocating movement along said track across said table, a bank of vertically aligned horizontally rotatable mirror galvanometers mounted on said carriage, housing means mounted on said carriage enclosing said bank of mirror galvanometers, means defining a vertically extended aperture in said housing on one side of said carriage adjacent to said bank of mirror galvanometers, a light source mounted on said carriage within said housing, an optical system mounted on said carriage within said housing for directing through said aperture a plurality of rays of light from said light source and reflected by said mirror galvanometers, a camera box mounted adjacent to said table lengthwise of the line of movement of said carriage and housing and adjacent to the side of said housing including said aperture, means defining a horizontally elongated window in the side of said camera box adjacent to said housing whereby said plurality of rays of light enter said window as said carriage is moved across said table, means for mounting a photosensitive web within said camera box, reeling means for reeling said web in said camera box vertically past said window, playback means for cyclicly reproducing a plurality of recorded transient signals, said playback means having a plurality of electrical output signals cyclicly corresponding to said transient signals and including a motor drive, means for delivering said output signals as input signals to said mirror galvanometers, first drive means slaved to the drive motor of said playback means for driving said carriage across said table in one direction, and second drive means for driving said carriage in the other direction across said table.

4. A recording oscillograph according to claim 3 in which said means for reeling a photosensitive web includes a pair of spindles rotatably supported in horizontal position within said camera box, one said spindle being located above said window and the other said spindle being located beneath said window.

References Cited in the file of this patent

UNITED STATES PATENTS

| | | |
|---|---|---|
| 1,867,176 | Rieckmann | July 12, 1932 |
| 2,293,349 | Martin | Aug. 18, 1942 |
| 2,389,828 | Swift | Nov. 27, 1945 |
| 2,803,515 | Begun et al. | Aug. 20, 1957 |
| 2,825,885 | Reynolds | Mar. 4, 1958 |
| 2,837,729 | Houghton et al. | June 3, 1958 |
| 2,845,615 | Bowman | July 29, 1958 |
| 2,858,523 | Hawkins | Oct. 28, 1958 |
| 2,932,001 | Reynolds | Apr. 5, 1960 |
| 2,976,107 | Klein et al. | Mar. 21, 1961 |